(12) United States Patent
Kono et al.

(10) Patent No.: US 7,981,536 B2
(45) Date of Patent: *Jul. 19, 2011

(54) MICROPOROUS MEMBRANE, BATTERY SEPARATOR AND BATTERY

(75) Inventors: Koichi Kono, Asaka (JP); Kohtaro Kimishima, Yokohama (JP); Hiroyuki Ozaki, Kawasaki (JP); Patrick Brant, Seabrook, TX (US); Jeffrey L. Brinen, League City, TX (US); Zerong Lin, Kingwood, TX (US)

(73) Assignee: Toray Tonen Specialty Separator Godo Kaisha (JP)

( * ) Notice: Subject to any disclaimer, the term of this patent is extended or adjusted under 35 U.S.C. 154(b) by 1307 days.

This patent is subject to a terminal disclaimer.

(21) Appl. No.: 11/513,557

(22) Filed: Aug. 31, 2006

(65) Prior Publication Data
US 2008/0057389 A1 Mar. 6, 2008

(51) Int. Cl.
*H01M 2/16* (2006.01)
*H01M 2/18* (2006.01)
*B32B 27/08* (2006.01)
*B29C 47/00* (2006.01)

(52) U.S. Cl. .... 429/144; 429/142; 428/516; 156/244.11

(58) Field of Classification Search .................. 429/144
See application file for complete search history.

(56) References Cited

U.S. PATENT DOCUMENTS

| | | | |
|---|---|---|---|
| 4,877,679 A | 10/1989 | Leatherman et al. | |
| 5,281,491 A * | 1/1994 | Rein et al. | 429/62 |
| 6,153,133 A | 11/2000 | Kaimai et al. | |
| 6,168,858 B1 | 1/2001 | Hasegawa et al. | |
| 6,245,272 B1 | 6/2001 | Takita et al. | |
| 6,878,226 B2 | 4/2005 | Yu | |
| 7,618,743 B2 | 11/2009 | Ohashi et al. | |
| 2006/0141351 A1 * | 6/2006 | Suh | 429/144 |
| 2007/0264578 A1 * | 11/2007 | Ozaki et al. | 429/254 |
| 2008/0057389 A1 | 3/2008 | Kono et al. | |

FOREIGN PATENT DOCUMENTS

| | | | |
|---|---|---|---|
| EP | 1693408 A1 * | 8/2006 | |
| JP | 02-77108 | 3/1990 | |
| JP | 03-064334 | 3/1991 | |
| JP | 06-096753 | 4/1994 | |
| JP | 07-268118 | 10/1995 | |
| JP | 2002-128943 | 5/2002 | |
| JP | 2-321323 | 7/2002 | |
| JP | 2002-194132 | 7/2002 | |
| JP | 2002284918 A * | 10/2002 | |
| JP | 2004-196870 | 7/2004 | |

(Continued)

OTHER PUBLICATIONS

Machine translation of JP 2004196870, Kobayashi et al., Jul. 2004.*

(Continued)

*Primary Examiner* — Basia Ridley
*Assistant Examiner* — Sean P Cullen
(74) *Attorney, Agent, or Firm* — DLA Piper LLP (US)

(57) ABSTRACT

Disclosed herein is multi-layer, microporous polyolefin membrane comprising a first porous layer comprising primarily a polyethylene, and a second porous layer comprising a polyethylene resin and polypropylene, the polypropylene having a weight-average molecular weight of $6 \times 10^5$ or more and a heat of fusion (measured by a differential scanning calorimeter) of 90 J/g or more, a fraction of the polypropylene having a molecular weight of $5 \times 10^4$ or less being 5% or less by mass.

56 Claims, 3 Drawing Sheets

FOREIGN PATENT DOCUMENTS

| | | |
|---|---|---|
| JP | 2004-196871 | 7/2004 |
| JP | 2004-089627 | 10/2004 |

OTHER PUBLICATIONS

Machine translation of JP 2002321323, Adachi et al., Nov. 2002.*
Human translation of JP 2004196870 A, Kobayashi et al., Jul. 2004.*
Human translation of JP 2002321323 A, Adachi et al., Nov. 2002.*
Takita et al., Machine translation of JP 2002284918 A, Oct. 2002.*
Sun, et al, *"Effect of Short Chain Branching on the Coil Dimensions of Polyolefins in Dilute Solution"*, Macromolecules, vol. 34, No. 19, pp. 6812-6820.

* cited by examiner

MICROPOROUS MEMBRANE, BATTERY SEPARATOR AND BATTERY

FIELD OF THE DISCLOSURE

The present invention relates to a multi-layer, microporous polyolefin membrane. Embodiments may have a layer comprising polyethylene and polypropylene and having well-balanced shutdown properties, meltdown properties, permeability and pin puncture strength. Other embodiments include a battery separator composed of such a multi-layer, microporous polyolefin membrane, and a battery comprising such a separator.

BACKGROUND

Microporous polyolefin membranes are widely used for various applications such as battery separators used for, e.g., lithium ion batteries, nickel-hydrogen batteries, nickel-cadmium batteries, polymer batteries, electrolytic capacitor separators, various filters such as reverse osmosis filtration membranes, ultrafiltration membranes, microfiltration membranes, moisture-permeable, waterproof clothes, medical materials, etc. When the microporous polyolefin membrane is used for battery separators, particularly lithium ion battery separators, its performance largely affects the properties, productivity and safety of the batteries. Accordingly, the microporous polyolefin membrane preferably has excellent mechanical properties, heat resistance, permeability, dimensional stability, shutdown properties, meltdown properties, etc.

In general, microporous membranes composed only of polyethylene have low meltdown temperatures, while microporous membranes composed only of polypropylene have high shutdown temperatures. Accordingly, it may be advantageous to produce microporous membranes comprising both polyethylene and polypropylene as main components for battery separators For example, JP2002-321323A proposes a microporous polyolefin membrane having a microporous membrane A comprising polyethylene and polypropylene as an indispensable component, and a microporous polyethylene membrane B, which are integrally laminated to have a three-layer structure of membrane A/membrane B/membrane A or membrane B/membrane A/membrane B.

WO 2004/089627 proposes a microporous, laminated polyolefin membrane constituted by two or more layers comprising polyethylene and polypropylene as indispensable components, a surface layer on at least one side containing more than 50% and 95% or less by mass of polypropylene, and the polyethylene content in the entire membrane being 50% to 95% by mass.

However, the microporous polyolefin membranes of these references fail to have good shutdown properties and pin puncture strength. Thus, it would be desirable to develop microporous membranes for battery separators comprising polyethylene and polypropylene and having well-balanced shutdown properties, meltdown temperatures, permeability and pin puncture strength as well as battery separators composed of such multi-layer, microporous polyolefin membrane, and batteries comprising such a separator.

SUMMARY

As a result of intense research in view of the above, the inventors have found that a multi-layer, microporous polyolefin membrane having well-balanced properties can be obtained by combining a porous polyethylene layer with a porous layer comprising polyethylene and polypropylene, the polypropylene having a weight-average molecular weight of $6 \times 10^5$ or more and a heat of fusion (measured by a differential scanning calorimeter) of 90 J/g or more, the fraction of the polypropylene having a molecular weight of $5 \times 10^4$ or less being 5% or less by mass.

Thus, embodiments of the multi-layer, microporous polyolefin membranes are described herein comprising at least a first porous layer (layer "A") of at least primarily polyethylene, and a second porous layer (layer "B") comprising polyethylene and polypropylene, the polypropylene having (1) a weight-average molecular weight of $6 \times 10^5$ or more, (2) a heat of fusion (measured by a differential scanning calorimeter) of 90 J/g or more, and (3) less than 5% by mass of polypropylene having a molecular weight of $5 \times 10^4$ or less.

Embodiments of the battery separators disclosed herein are composed of a multilayer, microporous polyolefin membrane comprising at least a first porous layer comprising at least primarily polyethylene, and a second porous layer comprising polyethylene and polypropylene, the polypropylene having a weight-average molecular weight of $6 \times 10^5$ or more, a heat of fusion (measured by a differential scanning calorimeter) of 90 J/g or more, and the fraction of the polypropylene having a molecular weight of $5 \times 10^4$ or less being 5% or less by mass.

Also disclosed herein are batteries comprising a separator composed of a multi-layer, microporous polyolefin membrane comprising at least a first porous layer (layer "A") comprising at least primarily polyethylene and a second porous layer (layer "B") comprising polyethylene and polypropylene, the polypropylene having (1) a weight-average molecular weight of $6 \times 10^5$ or more, (2) a heat of fusion (measured by a differential scanning calorimeter) of 90 J/g or more, and (3) the fraction of the polypropylene having a molecular weight of $5 \times 10^4$ or less being 5% or less by mass of the polypropylene.

To obtain a multi-layer, microporous polyolefin membrane as described herein, the polyethylene in the first and second porous layers preferably meets the following conditions:

(1) The polyethylene is preferably (a) ultra-high-molecular-weight polyethylene, (b) polyethylene other than ultra-high-molecular-weight polyethylene, or (c) a mixture of ultra-high-molecular-weight polyethylene and polyethylene other than ultra-high-molecular-weight polyethylene.

(2) Ultra-high-molecular-weight polyethylene has a weight-average molecular weight of $5 \times 10^5$ or more.

(3) The weight-average molecular weight of the ultra-high-molecular-weight polyethylene is more preferably $1 \times 10^6$ to $1.5 \times 10^7$, most preferably $1 \times 10^6$ to $5 \times 10^6$.

(4) The ultra-high-molecular-weight polyethylene is preferably an ethylene homopolymer, or an ethylene/α-olefin copolymer containing a small amount of an α-olefin other than ethylene.

(5) The polyethylene other than the ultra-high-molecular-weight polyethylene preferably has a weight-average molecular weight of $2 \times 10^5$ or more, and Mw/Mn of 5-300.

(6) The polyethylene composition preferably comprises (a) ultra-high-molecular-weight polyethylene having a weight-average molecular weight of $5 \times 10^5$ or more, and (b) at least one polyolefin selected from the group consisting of (i) polyethylene having a weight-average molecular weight of $1 \times 10^4$ or more and less than $5 \times 10^5$, (ii) polybutene-1 having a weight-average molecular weight of $1 \times 10^4$ to $4 \times 10^6$, (iii) a polyethylene wax having a weight-average molecular weight of $1 \times 10^3$ to $1 \times 10^4$, and (iv) an ethylene/α-olefin copolymer having a weight-average molecular weight of $1 \times 10^4$ to $4 \times 10^6$.

(7) The polyethylene composition described in (6) above preferably comprises ultra-high-molecular-weight polyethylene having a weight-average molecular weight of $5 \times 10^5$ or more, and polyethylene having a weight-average molecular weight of $1 \times 10^4$ or more and less than $5 \times 10^5$.

(8) The polyethylene having a weight-average molecular weight of $1 \times 10^4$ or more and less than $5 \times 10^5$ in the polyethylene composition described in (7) above is preferably at least one selected from the group consisting of (i) high-density polyethylene, (ii) medium-density polyethylene, (iii) branched low-density polyethylene, and (iv) linear low-density polyethylene.

(9) The polyethylene composition described in (8) above preferably comprises ultra-high-molecular-weight polyethylene having a weight-average molecular weight of $5 \times 10^5$ or more, and high-density polyethylene having a weight-average molecular weight of $1 \times 10^4$ or more and less than $5 \times 10^5$.

To obtain a multi-layer, microporous polyolefin membrane as described herein the polypropylene in the second porous layer preferably meets the following conditions:

(1) a weight-average molecular weight of $6 \times 10^5$ or more, preferably $8 \times 10^5$ or more.

(2) a fraction having a molecular weight of $5 \times 10^4$ or less (determined from a molecular weight distribution) of 5% or less, preferably 4.5% or less, preferably 3% or less by mass.

(3) a heat of fusion of 90 J/g or more, preferably 95 J/g or more, preferably 100 J/g or more.

(4) The content of the above polypropylene is preferably 20-80% by mass of the entire polyolefin composition forming the second porous layer.

The multi-layer, microporous polyolefin membrane described herein preferably has a porosity of 25-80%, air permeability (converted to the value at 20-μm thickness) of 20-2,000 seconds/100 cc, pin puncture strength of 2,000 mN/20 μm or more, a shutdown temperature of 140° C. or lower, and a meltdown temperature of 170° C. or higher, particularly 170-190° C.

The battery separator as described herein is formed by the above multi-layer, microporous polyolefin membrane. The battery as described herein comprises such a battery separator.

DETAILED DESCRIPTION

[1] Polyethylene

Figure 1:
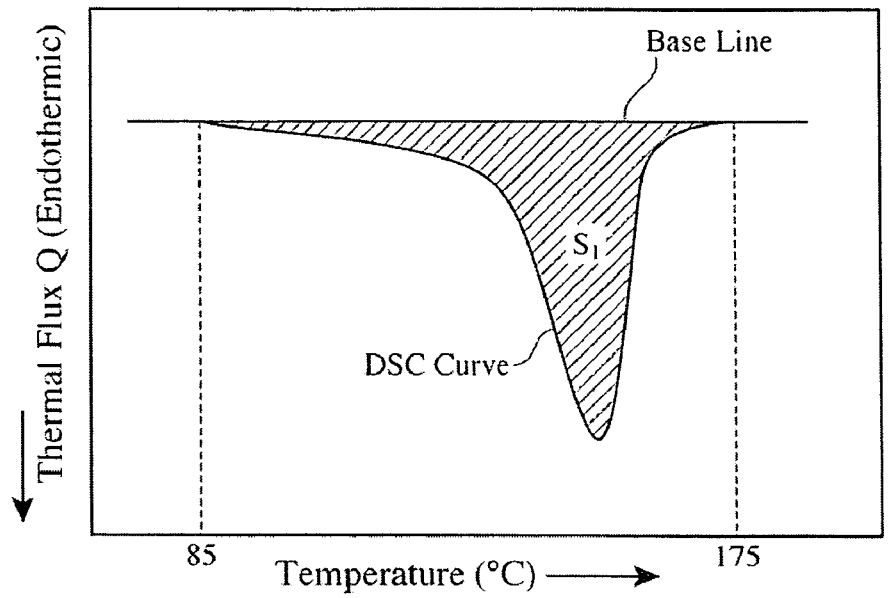
FIG. 1 is a graph showing one example of typical DSC curves.

The polyethylene resin forming the first porous layer (A) of the multi-layer, microporous polyolefin membrane of the present invention (hereinafter sometimes referred to simply as "multi-layer, microporous membrane") is (a) ultra-high-molecular-weight polyethylene, (b) polyethylene other than the ultra-high-molecular-weight polyethylene, or (c) a polyethylene composition, a mixture of ultra-high-molecular-weight polyethylene and the other polyethylene, or a mixture of ultra-high-molecular-weight polyethylene and polyolefin other than polyethylene and polypropylene. In any case, the polyethylene resin preferably has a weight-average molecular weight of $2 \times 10^5$ or more. When the weight-average molecular weight is less than $2 \times 10^5$, rupture is likely to occur when stretching the gel-like sheet (as hereinafter described), making it difficult to obtain a multi-layer, microporous polyolefin membrane having well balanced properties.

(a) When it is Ultra-High-Molecular-Weight Polyethylene

The ultra-high-molecular-weight polyethylene has a weight-average molecular weight of $5 \times 10^5$ or more. The ultra-high-molecular-weight polyethylene may be an ethylene homopolymer, or an ethylene/α-olefin copolymer containing a small amount of the other α-olefin. The α-olefin other than ethylene is preferably propylene, butene-1, hexene-1, pentene-1, 4-methylpentene-1, octene, vinyl acetate, methyl methacrylate, or styrene. The weight-average molecular weight of the ultra-high-molecular-weight polyethylene is preferably $1 \times 10^6$ to $15 \times 10^6$, more preferably $1 \times 10^6$ to $5 \times 10^6$.

(b) When it is Polyethylene Other than Ultra-High-Molecular-Weight Polyethylene

The polyethylene other than the ultra-high-molecular-weight polyethylene preferably has a weight-average molecular weight of $1 \times 10^4$ or more and less than $5 \times 10^5$, being at least one selected from the group consisting of high-density polyethylene, medium-density polyethylene, branched low-density polyethylene, and linear low-density polyethylene. The polyethylene having a weight-average molecular weight of $1 \times 10^4$ or more and less than $5 \times 10^5$ may be an ethylene homopolymer, or a copolymer containing a small amount of another α-olefin such as propylene, butene-1, hexene-1, pentene-1, 4-methylpentene-1, octene, vinyl acetate, methyl methacrylate, or styrene. Such copolymer is preferably produced using a single-site catalyst.

(c) When it is a Polyethylene Composition

The polyethylene composition is (i) a polyethylene composition comprising ultra-high-molecular-weight polyethylene having a weight-average molecular weight of $5 \times 10^5$ or more, and a second polyethylene, or (ii) a polyethylene composition comprising ultra-high-molecular-weight polyethylene having a weight-average molecular weight of $5 \times 10^5$ or more, and polyolefin other than polyethylene and polypropylene. The ultra-high-molecular-weight polyethylene and the second polyethylene may be the same as above. The other polyethylene preferably has a weight-average molecular weight of $1 \times 10^4$ or more and less than $5 \times 10^5$. The polyolefin other than polyethylene and polypropylene may be at least one selected from the group consisting of polybutene-1 having a weight-average molecular weight of $1 \times 10^4$ to $4 \times 10^6$, a polyethylene wax having a weight-average molecular weight of $1 \times 10^3$ to $1 \times 10^4$, and an ethylene/α-olefin copolymer having a weight-average molecular weight of $1 \times 10^4$ to $4 \times 10^6$. The amount of the ultra-high-molecular-weight polyethylene in the polyethylene composition is preferably 1% or more by mass, more preferably 1-80% by mass, based on 100% by mass of the entire polyethylene composition.

Preferably the polyethylene composition is a composition comprising the above ultra-high-molecular-weight polyethylene, and a second polyethylene having a weight-average molecular weight of $1 \times 10^4$ or more and less than $5 \times 10^5$, wherein the second polyethylene is at least one selected from the group consisting of high-density polyethylene, medium-density polyethylene, branched low-density polyethylene, and linear low-density polyethylene. The molecular weight distribution (Mw/Mn) of this polyethylene composition can be controlled depending on applications. Particularly preferable is a composition of ultra-high-molecular-weight polyethylene and high-density polyethylene.

(d) Molecular Weight Distribution Mw/Mn

Mw/Mn is a measure of a molecular weight distribution, and the larger this value, the broader the molecular weight distribution. Though not particularly restricted, the Mw/Mn of the polyethylene resin is preferably 5-300, more preferably 10-100, when the polyethylene resin is composed of ultra-high-molecular-weight polyethylene or a polyethylene composition. An Mw/Mn of less than 5 may result in difficulty during melt extrusion due to the relatively large high molecular weight fraction. An Mw/Mn of more than 300, may result in a decrease in the strength of the microporous membrane. The Mw/Mn of polyethylene (homopolymer or an ethylene/α-olefin copolymer) can be properly controlled by a multi-stage polymerization. The multi-stage polymerization method is preferably a two-stage polymerization method comprising forming a high-molecular-weight polymer component in the first stage, and forming a low-molecular-weight polymer component in the second stage. In the case of the polyethylene composition, the larger the Mw/Mn, the larger difference in a weight-average molecular weight exists between the ultra-high-molecular-weight polyethylene and the other polyethylene or polyolefin, and vice versa. The Mw/Mn of the polyethylene composition can be properly controlled by the molecular weights and mixing ratios of components.

[2] Polyolefin Composition

The polyolefin composition forming the second porous layer (layer "B") of the multi-layer, microporous polyolefin membrane of the present invention preferably comprises a polyethylene resin, and polypropylene having a weight-average molecular weight of $6 \times 10^5$ or more, and a heat of fusion (measured by a differential scanning calorimeter) of 90 J/g or more, the fraction of the polypropylene having a molecular weight of $5 \times 10^4$ or less being 5% or less by mass of the polypropylene.

(a) Polyethylene

The polyethylene described above may be used in the second porous layer (B), and its composition may be the same as or different from that of the polyethylene in the first porous layer (A), depending on the desired properties.

(b) Polypropylene

The polypropylene preferably has a weight-average molecular weight of $6 \times 10^5$ or more, and a heat of fusion ΔHm (measured by a differential scanning calorimeter (DSC) according to JIS K7122) of 90 J/g or more, a fraction of the polypropylene having a molecular weight of $5 \times 10^4$ or less (determined from a molecular weight distribution) being 5% or less by mass. A temperature-elevating speed for the measurement of the heat of fusion is preferably 3-20° C./minute, usually 10° C./minute. Because polypropylene having a weight-average molecular weight of less than $6 \times 10^5$ has low dispersibility in the polyethylene resin, its use makes stretching difficult, providing large micro-roughness to a surface of the second porous layer and large thickness variation to the multi-layer, microporous membrane. When a fraction of the polypropylene having a molecular weight of $5 \times 10^4$ or less is more than 5% by mass of the polypropylene, the multi-layer, microporous membrane may have undesirably low meltdown properties. When the polypropylene has a heat of fusion ΔHm of less than 90 J/g, the resultant multi-layer, microporous membrane may have low meltdown properties and permeability.

The weight-average molecular weight of the polypropylene is preferably $6.5 \times 10^5$ or more, more preferably $8 \times 10^5$ or more. A fraction of the polypropylene having a molecular weight of $5 \times 10^4$ or less is preferably 4.5% or less by mass, more preferably, 3% or less by mass, of the polypropylene.

The heat of fusion ΔHm of the polypropylene is preferably 95 J/g or more, more preferably 100 J/g or more. The molecular weight distribution, Mw/Mn, is preferably 5 or less, more preferably 4 or less, most preferably 2.5 or less.

It is preferred that (1) if the weight-average molecular weight of the polypropylene is from $6 \times 10^5$ to $1 \times 10^6$ or less then the Mw/Mn of the polypropylene is 2.5 or less; (2) if the weight-average molecular weight is $1.5 \times 10^6$ or less then the Mw/Mn is 3 or less; (3) if the weight-average molecular weight is $2 \times 10^6$ or less then the Mw/Mn is 4 or less; and (4) if the weight-average molecular weight is $2 \times 10^6$ or more then the Mw/Mn is 5 or less.

The polypropylene content of layer B may be 5-95% by mass, but preferably 20-80% by mass, more preferably 30-70% by mass, of the entire polyolefin composition. When the polypropylene content is less than 20% by mass, the meltdown temperature may be less desirable. When the polypropylene content exceeds 80% by mass, the multi-layer, microporous membrane tends to have less than desirable thickness uniformity and permeability.

As long as the above conditions of the weight-average molecular weight, a fraction having a molecular weight of $5 \times 10^4$ or less (determined from a molecular weight distribution), and the heat of fusion are met, the type of the polypropylene is not particularly restrictive, but may be a propylene homopolymer, a copolymer of propylene and the other α-olefin, or a mixture thereof, the homopolymer being preferable. The copolymer may be a random or block copolymer. The α-olefins in a polypropylene copolymer, the comonomer may include, for example, ethylene, butene-1, pentene-1, hexene-1,4-methylpentene-1, octene, vinyl acetate, methyl methacrylate, styrene, and combinations thereof.

[3] Production Method of Multi-Layer, Microporous Polyolefin Membrane (a) First Production Method A first method for producing a multi-layer, microporous polyolefin membrane in accordance with embodiments of the present invention comprises the steps of ((1) mixing a polyethylene resin and a diluent to prepare a first melt-blend (a first polyolefin solution), (2) mixing a polyolefin composition and a diluent to prepare a second melt-blend (a second polyolefin solution), (3) extruding the first and second polyolefin solutions through separate dies, (4) cooling each of the resultant extrudates to form a gel-like sheet, (5) stretching each gel-like sheet to form each film, (6) removing the diluent from each film, (7) drying each film to form porous membrane, (8) heat-treating each membrane, and (9) laminating the resultant first and second microporous polyolefin membranes. After the step (9), if desirable, other steps such as a step (10) of cross-linking with ionizing radiations, and/or a hydrophilizing treatment step (11) may be conducted.

(1) Preparation of the First Polyolefin Solution

The polyethylene resin is melt-blended with a proper diluent to prepare the first polyolefin solution. The first polyolefin solution may in some embodiments, contain various additives such as antioxidants, ultraviolet absorbers, antiblocking agents, pigments, dyes, inorganic fillers, if desirable. For example, fine silicate powder may be added as a pore-forming agent.

The diluent is preferably liquid at room temperature. The use of a liquid solvent makes it possible to conduct stretching at a relatively high magnification. The liquid solvents may be aliphatic or alicyclic hydrocarbons such as, for example, nonane, decane, decalin, p-xylene, undecane, dodecane, liquid paraffins, mineral oil distillates having boiling points comparable to those of the above hydrocarbons, phthalates liquid at room temperature (e.g., dibutyl phthalate, dioctyl phthalate), mixtures thereof, and mixtures of liquid paraffins. To obtain a gel-like sheet having a stable liquid solvent content, it is preferable to use non-volatile liquid solvents such as liquid paraffin. A solvent which is miscible with polyethylene in a melt-blended state but solid at room temperature may be mixed with the liquid solvent. Such solid solvents includes stearyl alcohol, ceryl alcohol, and paraffin waxes. However, when only a solvent which is solid at room temperature is used, uneven stretching may occur.

The viscosity of the liquid solvent is preferably 30-500 cSt, more preferably 30-200 cSt, at a temperature of 25° C. When the viscosity at 25° C. is less than 30 cSt, the extrusion of the polyolefin solution from the die may result in non-uniformity of the sheet. On the other hand, when the viscosity is more than 500 cSt, the removal of the liquid solvent is difficult.

Though not particularly restricted, the uniform mixing of the first polyolefin solution is preferably conducted in a double-screw extruder. Mixing in the double-screw extruder is suitable for preparing a high-concentration polyolefin solution. Regardless of whether the polyethylene resin is ultra-high-molecular-weight polyethylene, other polyethylene or a polyethylene composition, the mixing temperature is preferably in a range from the melting point (Tm1) of the polyethylene resin+10° C. to Tm1+100° C. Specifically, the mixing temperature is preferably 160-250° C., more preferably 180-230° C. The melting point is determined by differential scanning calorimetry (DSC) according to JIS K7121. The diluent may be added before blending, or charged into the double-screw extruder in an intermediate portion during blending, though it is preferably added before blending. In the mixing, an antioxidant is preferably added to prevent oxidation of the polyethylene resin.

A ratio L/D of the screw length L to the screw diameter D in the double-screw extruder is preferably in a range of 20-100, more preferably in a range of 35-70. When L/D is less than 20, mixing may be insufficient. When L/D is more than 100, the residence time of the polyolefin solution in the double-screw extruder may be too long. The cylinder of the double-screw extruder preferably has an inner diameter of 40-100 mm.

The amount of the polyethylene resin is preferably 1-50% by mass, more preferably 20-40% by mass, per 100% by mass of the first polyolefin solution. When the polyethylene resin is less than 1% by mass, large swelling or neck-in may occur at the die exit during the extrusion of the first polyolefin solution to form a gel-like molding, resulting in decrease in the formability and self-support of the gel-like molding. On the other hand, when the polyethylene resin is more than 50% by mass, the formability of the gel-like molding may be deteriorated.

(2) Preparation of the Second Polyolefin Solution

The second polyolefin solution may be prepared by adding the above diluent to a polyolefin composition, and mixing the resultant mixture. In this embodiment, the method for preparing the second polyolefin solution differs from the method for preparing the first polyolefin solution, only in that the mixing temperature is preferably in a range from the melting point (Tm2) of polypropylene to Tm2+90° C., and that the polyolefin composition content is preferably 1-50% by mass, more preferably 20-40% by mass.

(3) Extrusion

Each of the first and second polyolefin solutions is extruded through a die directly from the extruder or via another extruder, or via another extruder after being cooled and pelletized. The die used is preferably a sheet-forming die having a rectangular-cross-section orifice, though a double-cylindrical hollow die, an inflation die lip, etc. may also be used. In the case of the sheet-forming die, the die gap is preferably 0.1-5 mm, and it is preferably heated at 140-250° C. during extrusion. The extrusion speed of the heated solution is preferably 0.2 to 15 m/minute.

A ratio Q/Ns of the extrusion rate Q (kg/h) of the second polyolefin solution to the rate of rotation (Ns (rpm)) of the screw in the double-screw extruder is preferably 0.3 kg/h/rpm or less. This may improve the dispersibility of polypropylene in the second porous layer, resulting in further improved thickness uniformity and heat resistance. The number of revolutions Ns of the screw is preferably 50 rpm or more. Though not particularly restricted, the upper limit of the number of revolutions Ns of the screw is preferably 500 rpm. Q/Ns is more preferably 0.3 kg/h/rpm or less. Though not particularly restricted, the lower limit of Q/Ns is preferably 0.01 kg/h/rpm. Q/Ns can be controlled by selecting the shape of the screw (for instance, diameter, depth of grooves at the exit, etc.).

(4) Formation of Gel-Like Sheet

The polyolefin solutions extruded from the die or dies are formed into the first and second sheet-shaped, gel-like moldings (gel-like sheets) by cooling. Cooling is preferably conducted at least to a gelation temperature or lower at a speed of 50° C./minute or more. Cooling is preferably conducted to 25° C. or lower. Such cooling sets the micro-phases of the resins (the polyethylene resin in the first gel-like sheet, and the polyolefin composition in the second gel-like sheet) separated by the diluent. Generally, the slower cooling speed provides the gel-like sheet with larger pseudo-cell units, resulting in a coarser higher-order structure. On the other hand, the higher cooling speed may result in denser cell units. The cooling speed less than 50° C./minute may lead to increased crystallinity, making it unlikely to provide the gel-like sheet with suitable stretchability. Non limiting examples of cooling methods include methods of bringing the gel-like sheet into direct contact with a cooling medium such as cooling air, cooling water, and methods of bringing the gel-like sheet into contact with rolls cooled by a cooling medium, etc.

(5) Stretching

The resultant first and second gel-like sheets preferably are stretched in at least one direction. Each gel-like sheet is stretched to a predetermined magnification after being heated, by, for example, a tenter method, a roll method, an inflation method, a rolling method or a combination thereof. The stretching may be conducted monoaxially or biaxially, though the biaxial stretching is preferable. In the case of biaxial orientation, any of simultaneous biaxial stretching, sequential stretching or multi-stage stretching (for instance, a combination of the simultaneous biaxial stretching and the sequential stretching) may be used, though the simultaneous biaxial stretching is preferable. The stretching improves the mechanical strength of the membrane.

The stretching magnification is preferably two times (2×) or more, more preferably 3×-30× in monoaxial stretching. In the biaxial stretching, the stretching magnification is preferably 3× or more in any direction, preferably 9× or more in area magnification, more preferably 16× or more in area magnification. With the area magnification of 9× or more, the pin puncture strength of the membrane may be improved. When the area magnification is more than 400×, stretching apparatuses, and stretching operations, may be restricted.

Regardless of whether each polyethylene resin in the first and second gel-like sheets is a homopolymer or a copolymer when it is ultra-high-molecular-weight polyethylene or the other polyethylene (not the composition), the stretching temperature is preferably the melting point Tm1 of the polyethylene resin+10° C. or lower, more preferably in a range of the crystal dispersion temperature of the polyethylene resin or higher and lower than the crystal melting point of the polyethylene resin. When the stretching temperature is higher than the melting point Tm1+10° C., the polyethylene resin is molten, failing to orient molecular chains by stretching. When the stretching temperature is lower than the crystal dispersion temperature, the polyethylene resin is so insufficiently softened that the membrane is easily broken by stretching, failing to achieve high-magnification stretching. When a sequential stretching or a multi-stage stretching is conducted, primary stretching may be conducted at a lower temperature than the crystal dispersion temperature. The "crystal dispersion temperature" is determined by measuring the temperature characteristics of the kinetic viscoelasticity according to ASTM D 4065. The ultra-high-molecular-weight polyethylene and the other polyethylene may generally have crystal dispersion temperatures of about 90-100° C.

In a case where each polyethylene resin in the first and second gel-like sheets is a polyethylene composition, the stretching temperature is preferably in a range of the crystal dispersion temperature of the polyethylene composition or higher and the crystal melting point of the polyethylene composition+10° C. or lower. The stretching temperature is usually 100-140° C., preferably 110-120° C. for the first gel-like sheets and 110-140° C. for the second gel like sheets.

Depending on desired properties, stretching may be conducted with a temperature distribution in a thickness direction, or sequential or multi-stage stretching may be conducted with primary stretching at relatively low temperatures and secondary stretching at higher temperatures. The stretching with a temperature distribution in a thickness direction may generally provide a microporous polyolefin membrane with excellent mechanical strength. The detailed description of this method is given in Japanese Patent 3347854, incorporated herein by reference.

(6) Removal of Diluent

For the purpose of removing (washing away) the liquid solvent, a washing solvent is used. When a resin phase (a polyethylene resin phase in the first gel-like sheet or stretched film, and a polyolefin composition phase in the second gel-like sheet or stretched film) is separated from a diluent phase, the removal of the liquid solvent creates a porous membrane. The removal (washing away) of the liquid solvent may be conducted by using washing solvents including, for example, volatile solvents such as saturated hydrocarbons such as pentane, hexane, heptane, chlorinated hydrocarbons such as methylene chloride, carbon tetrachloride, ethers such as diethyl ether, dioxane, ketones such as methyl ethyl ketone, linear fluorocarbons such as trifluoroethane, $C_6F_{14}$, $C_7F_{16}$, etc., cyclic hydrofluorocarbons such as $C_5H_3F_7$, hydrofluoroethers such as $C_4F_9OCH_3$, $C_4F_9OC_2H_5$, or perfluoroethers such as $C_4F_9OCF_3$, $C_4F_9OC_2F_5$. These washing solvents have low surface tension (for instance, 24 mN/m or less at 25° C.). The use of a washing solvent with low surface tension prevents the pore-forming network structure from shrinking by surface tension in a gas-liquid interface during drying after washing, thereby providing the microporous polyolefin membrane with high porosity and permeability.

The washing of the film after stretching may be conducted by, without limitation, immersion in the washing solvent and/or showering with the washing solvent. The washing solvent used is preferably 300-30,000 parts by mass per 100 parts by mass of the stretched membrane. Washing is preferably conducted until the amount of the remaining liquid solvent becomes less than 1% by mass of that added.

(7) Drying

The first and second microporous polyolefin membranes obtained by stretching and the removal of the diluent may be dried by, for example, a heat-drying method, or an air-drying method. The drying temperature is preferably equal to or lower than the crystal dispersion temperature of the polyethylene resin, particularly preferably 5° C. or more lower than the crystal dispersion temperature. Drying is preferably conducted until the remaining washing solvent becomes 5% or less by mass, more preferably 3% or less by mass, per 100% by mass (on a dry basis) of the microporous membrane. Insufficient drying undesirably leads to decrease in the porosity of the microporous membrane by a subsequent heat treatment, resulting in poor permeability.

(8) Heat Treatment

The dried first and second microporous membranes are preferably heat-treated. The heat treatment stabilizes crystals, resulting in uniform lamella layers. The heat treatment method may be, for example, a heat-stretching treatment, a heat-setting treatment and/or a heat-shrinking treatment, which may be properly selected depending on the required properties. The heat treatment is preferably conducted at a temperature equal to or lower than the melting point of the polyethylene resin, preferably at a temperature between 60° C. and (the melting point −2° C.).

The heat-stretching treatment and the heat-setting treatment are conducted more preferably by a tenter method, a roll method or a rolling method. In the case of the heat-stretching treatment, the stretching magnification is preferably 1.01×-2.0×, more preferably 1.01×-1.5×, in at least one direction. The heat-shrinking treatment may be conducted by using a belt conveyer or an air-floating heating furnace, in addition to the above methods. In the heat-shrinking treatment, the shrinkage ratio is preferably 50% or less, more preferably 30% or less, in at least one direction.

The heat-stretching treatment improves the permeability of the microporous polyolefin membrane and increases its pore diameters. A heat-setting treatment is preferably conducted further after the heat-stretching treatment. When the heat-shrinking treatment is conducted after the heat-stretching treatment, the resultant microporous polyolefin membrane is provided with a low shrinkage ratio and high strength.

(9) Lamination

The dried or heat-treated, first and second microporous polyolefin membranes are bonded to desired lamination structures. Though not particularly restricted, the bonding is preferably conducted by a heat-bonding method. The heat-bonding method includes a heat-sealing method, an impulse-sealing method, an ultrasonic-bonding method, etc., and the heat-sealing method is preferable. Preferable as the heat-sealing method is a heat roll method, which heat-seals the overlapped first and second microporous polyolefin membranes through a pair of heat rolls or through a heat roll and a plate. The heat-sealing temperature and pressure are not particularly restricted, as long as the microporous polyolefin membranes are fully bonded to provide a multi-layer, microporous membrane without deteriorating the properties to an unacceptable level. The heat-sealing temperature is, for instance, 90-135° C., preferably 90-115° C. The heat-sealing pressure is preferably 0.1-50 MPa.

(10) Cross-Linking

The multi-layer, microporous polyolefin membrane may be cross-linked, by way of example, ionizing radiation rays such as α-rays, β-rays, γ-rays, electron beams. In the case of irradiating electron beams, the amount of electron beams is preferably 0.1-100 Mrad, and the accelerating voltage is preferably 100-300 kV. The cross-linking treatment elevates the meltdown temperature of the multi-layer, microporous polyolefin membrane.

(11) Hydrophilizing Treatment

The multi-layer, microporous polyolefin membrane may be subjected to a hydrophilizing treatment (treatment of imparting hydrophilic property). The hydrophilizing treatment may be, for example, a monomer-grafting treatment, a surfactant treatment, or a corona-discharging treatment. If used, the monomer-grafting treatment is preferably conducted after the cross-linking treatment.

In the case of a surfactant treatment, any of nonionic surfactants, cationic surfactants, anionic surfactants and amphoteric surfactants may be used. Nonionic surfactants are preferred. In some surfactant treatments, the multi-layer, microporous polyolefin membrane is dipped in a solution of the surfactant in water or a lower alcohol such as, for example, methanol, ethanol, or isopropyl alcohol, or coated with the solution by a doctor blade method. Other coatings may be applied, if desirable.

(b) Second Production Method

A second production method comprises the steps of (1) preparing the first and second polyolefin solutions as in the first production method, (2) simultaneously coextruding the first and second polyolefin solutions through dies to form a coextruded laminar extrudate, (3) cooling the laminar extrudate to form a multi-layer, gel-like sheet, (4) stretching the multi-layer, gel-like sheet, (5) removing a diluent from the stretched, multi-layer, gel-like sheet, (6) drying the sheet, and (7) heat-treating the sheet. After the step (7), if desirable, (8) a step of cross-linking with ionizing radiations, or (9) a hydrophilizing treatment step may be conducted. The stretching method, the method of removing a diluent, the drying method, the heat-treating method, the cross-linking method and the hydrophilizing treatment method may be the same as described above. Accordingly, detailed explanations will be made only on the simultaneous coextrusion step (2) and the step (3) of forming the multi-layer, gel-like sheet.

In the preferred embodiment of the simultaneous coextrusion of the first and second polyolefin solutions, a die is connected to pluralities of extruders when both solutions are combined in a laminar manner in a die and extruded therefrom (bonding in the die), or a die is connected to each of extruders when both solutions are extruded in a sheet form from separate dies and bonded outside the die. Bonding in the die is preferable.

Any of a flat die method and an inflation method may be used for the simultaneous extrusion. In any method, the bonding in the die may be conducted by a multi-manifold method, in which the solutions are supplied to separate manifolds in a multi-layer extrusion die and laminated at a die lip inlet, or by a block method, in which solutions are combined to a laminar flow in advance and supplied to a die. Multi-layer-sheet-forming, flat or inflation dies may be used. The multi-layer-sheet-forming flat die preferably has a gap of 0.1-5 mm. In the case of bonding outside the die by the flat die method, sheet-shaped solutions extruded from the dies are press-bonded by a pair of rolls. In either of the above methods, the die is preferably heated to a temperature of 140-250° C. during extrusion. The extruding speed of the heated solution is preferably within a range of 0.2-15 m/minute. The multi-layer extrudate thus obtained is cooled to form a multi-layer, gel-like sheet. The cooling speed, temperature and method of the extrudate may be the same as described above in the first production method.

[3] Multi-Layer, Microporous Polyolefin Membrane

The multi-layer, microporous polyolefin membranes obtained by the above methods preferably have the following properties.

(a) Porosity of 25-80%

When the porosity is less than 25%, the multi-layer, microporous polyolefin membrane may not have good air permeability. When the porosity exceeds 80%, it may be difficult to produce batteries with well-balanced safety and impedance.

(b) Air Permeability of 20-2,000 seconds/100 cc (Converted to the Value at 20-μm Thickness)

When the air permeability is 20-2,000 seconds/100 cc, batteries with separators formed by the multi-layer, microporous polyolefin membrane have high power and good cycle performance. When the air permeability exceeds 2,000 seconds/100 cc, the batteries may have decreased power. When the air permeability is less than 20 seconds/100 cc, shutdown prior to meltdown is unlikely to occur when the temperatures inside the batteries are elevated.

(c) Pin Puncture Strength of 2,000 mN/20 μm or More

When the pin puncture strength is less than 2,000 mN/20 μm, short-circuiting may likely to occur in batteries with separators formed by the multi-layer, microporous polyolefin membrane.

(d) Shutdown Temperature of 120-140° C.

The temperature at which the air permeability of the multi-layer, microporous polyolefin membrane reaches 100,000 seconds/100 cc is defined as a shutdown temperature.

(e) Meltdown Temperature of 170° C. or Higher

The meltdown temperature is preferably 170-190° C.

(f) Number Average Molecular Weight

Mn is measured by GPC-DRI with appropriate standards and columns.

[4] Battery Separator

When used as a battery separator, the membrane formed by the above multi-layer, microporous polyolefin membrane preferably has a thickness of 3-200 μm, more preferably 5-50 μm. The desirable thickness will depend on the type of battery in which the separator will be used.

Though not particularly restricted, the multi-layer, microporous polyolefin membrane described and claimed herein, and therefore a battery separator composed thereof, preferably has a two-layer structure comprising a first porous layer A and a second porous layer B; a three-layer structure comprising a first porous layer A, a second porous layer B and a first porous layer A; or a three-layer structure comprising a second porous layer B, a first porous layer A and a second porous layer B. Though the thickness ratio of the first porous layer A to the second porous layer B is not particularly restricted, the percentage of the thickness of the second porous layer B to the total thickness of the multi-layer, microporous membrane is preferably 3-90%, more preferably 10-60%.

[5] Battery

The multi-layer, microporous polyolefin membranes of the present invention may be used as separators for primary and secondary batteries such as, by way of example only, nickel-hydrogen batteries, nickel-cadmium batteries, nickel-zinc batteries, silver-zinc batteries, lithium primary batteries, lithium-ion secondary batteries, lithium-polymer secondary batteries, particularly for lithium-ion secondary batteries.

Lithium-ion secondary batteries comprise a positive electrode and a negative electrode laminated via a separator, and the separator contains an electrolytic solution (electrolyte). The electrode structure may be, for example, a coin type in which disc-shaped positive electrode and negative electrode are opposing, a laminate type in which planar positive electrode and negative electrode are alternately laminated, or a toroidal type, such as a cylindrical and prismatic types, in which ribbon-shaped positive electrode and negative electrode are wound.

The positive electrode usually comprises a current collector, and a positive-electrode active material layer capable of absorbing and discharging lithium ions, which is formed on the current collector. The positive-electrode active materials may be inorganic compounds such as transition metal oxides, composite oxides of lithium and transition metals (lithium composite oxides), or transition metal sulfides. Preferred examples of the lithium composite oxides are lithium nickelate, lithium cobaltate, lithium manganate, and laminar lithium composite oxides based on $\alpha$-NaFeO2. The negative electrode usually comprises a current collector, and a negative-electrode active material layer formed on the current collector. The negative-electrode active materials may be carbonaceous materials such as, for example, natural graphite, artificial graphite, cokes, carbon black, etc.

The electrolytic solutions may be obtained by dissolving lithium salts in organic solvents. The lithium salts may be, for example, LiClO4, LiPF6, LiAsF6, LiSbF6, LiBF4, LiCF3SO3, LiN(CF3SO2)$_2$, LiC(CF3SO2)$_3$, Li2B10Cl10, LiN(C2F5SO2)$_2$, LiPF4(CF3)$_2$, LiPF3(C2F5)$_3$, lower aliphatic carboxylates of lithium, LiAlCl4. The lithium salts may be used alone or in combination. The organic solvents may be organic solvents having high boiling points and high dielectric constants such as ethylene carbonate, propylene carbonate, ethylmethyl carbonate, $\gamma$-butyrolactone; organic solvents having low boiling points and low viscosity such as tetrahydrofuran, 2-methyltetrahydrofuran, dimethoxyethane, dioxolane, dimethyl carbonate, diethyl carbonate, etc. These organic solvents may be used alone or in combination. Because the organic solvents having high dielectric constants have high viscosity, while those having low viscosity have low dielectric constants, their mixtures are preferably used.

When the battery is assembled, the micropore of the separator is filled with the electrolytic solution, so that the separator (multi-layer, microporous membrane) provides ion permeability. When a cylindrical battery is assembled, for instance, a positive electrode sheet, a separator formed by the multi-layer, microporous membrane, a negative electrode sheet and the same separator are laminated in this order, and the resultant laminate is wound to a toroidal-type electrode assembly. The resultant electrode assembly is charged into a battery can and then impregnated with the above electrolytic solution, and a battery lid acting as a positive electrode terminal provided with a safety valve is caulked to the battery can via a gasket to produce a battery.

The Examples below are intended to assist in understanding the invention and are not intended to limit the claims.

The following sample preparations were used in measuring the molecular weight of the polypropylene in the Examples:
Sample Prep Method A—Dissolve sample at 175° C. microwave for 1 hour then filter dissolution with 2 μm filter strips.
Sample Prep Method B—Dissolve samples at 160° C. shaker oven for 2 hours, dissolve samples at 175° C. microwave for 1 hour, then filter dissolution with 2 μm filter strips.
Sample Prep Method C—Dissolve samples at 175° C. shaker oven for 4 hours then filter dissolution with 2 μm filter strips.
Sample Prep Method D—Dissolve sample at 160° C. shaker oven for 2 hour then filter dissolution with 2 μm filter strips.

The PP samples of Examples 1 and 2 were prepared according to Sample Prep Method A.

The PP samples of Examples 3-11, and Comparative Example 4 were prepared according to Sample Prep Method B.

The PP samples of Example 12 was prepared according to Sample Prep Method C.

The PP samples of Comparative Example 1 was prepared according to Sample Prep Method D.

The PP samples of Comparative Example 3 was prepare according to the sample preparation method set forth in the article "Effect of Short Chain Branching on the Coil Dimensions of Polyolefins in Dilute Solution," Sun et al., MACROMOLECULES, vol. 34, no. 19, pp. 6812-6820.

Example 1

(1) Production of First Microporous Polyolefin Membrane

Dry-blended were 100 parts by mass of a polyethylene (PE) composition comprising 18% by mass of ultra-high-molecular-weight polyethylene (UHMWPE) having a weight-average molecular weight (Mw) of $2.5 \times 10^6$, and 82% by mass of high-density polyethylene (HDPE) having Mw of $3.0 \times 10^5$, and 0.05 parts by mass of tetrakis[methylene-3-(3, 5-ditertiary-butyl-4-hydro xyphenyl)-propionate] methane as an antioxidant. Measurement revealed that the polyethylene composition of UHMWPE and HDPE had a melting point of 135° C., and a crystal dispersion temperature of 90° C.

The Mw and Mn of UHMWPE and HDPE were measured by a gel permeation chromatography (GPC) method under the following conditions.
Measurement apparatus: GPC-150C available from Waters Corporation,
Column: Shodex UT806M available from Showa Denko K.K.,
Column temperature: 135° C.,
Solvent (mobile phase): o-dichlorobenzene,
Solvent flow rate: 1.0 ml/minute,
Sample concentration: 0.1% by weight (dissolved at 135° C. for 1 hour),
Injected amount: 500 μl,
Detector: Differential Refractometer available from Waters Corp., and
Calibration curve: Produced from a calibration curve of a set of single-dispersion, standard polystyrene sample using a predetermined conversion constant. Weight-average molecular weights of polyethylene and polypropylene are reported herein in the units of g/mol.

Thirty parts by mass of the resultant mixture was charged into a strong-blending double-screw extruder having an inner diameter of 58 mm and L/D of 42, and 70 parts by mass of liquid paraffin [40 cSt (40° C.)] was supplied to the double-screw extruder via a side feeder. Melt-blending was conducted at 210° C. and 200 rpm to prepare a first polyolefin solution. This first polyolefin solution was extruded from a T-die mounted to a tip end of the double-screw extruder, and cooled by cooling rolls controlled at 5° C. to form a first gel-like sheet.

Using a tenter-stretching machine, the first gel-like sheet was simultaneously biaxially stretched at 118° C., such that the stretching magnification was 5× in both machine direction (MD) and transverse direction (TD). The stretched film was fixed to an aluminum frame of 20 cm×20 cm, and immersed in methylene chloride [surface tension: 27.3 mN/m (25° C.), boiling point: 40.0° C.] controlled at 25° C., and washed with the vibration of 100 rpm for 3 minutes. The resultant membrane was air-cooled at room temperature and heat-set at 122° C. for 10 minutes while being fixed to the aluminum frame, to produce a first microporous polyolefin membrane A.

(2) Production of Second Microporous Polyolefin Membrane

Dry-blended were 100 parts by mass of a polyolefin (PO) composition comprising 1% by mass of the UHMWPE, 49% by mass of the HDPE, and 50% by mass of an ultra-high-molecular-weight propylene homopolymer (PP) having Mw of $10.1 \times 10^5$ (a fraction having a molecular weight of $5 \times 10^4$ or less was 4.3% by mass), and a heat of fusion of 108.2 J/g, and 0.5 parts by mass of dibutylhydroxytoluene as an antioxidant. Measurement revealed that the polyethylene composition of UHMWPE and HDPE had a melting point of 135° C., and a crystal dispersion temperature of 90° C.

The Mw and Mn of the PP was measured by a GPC method under the following conditions.

Measurement apparatus: Alliance 2000 GPC available from Waters Corp.,

Columns: Three PL Gel mixed-B available from Polymer Laboratories,

Column temperature: 145° C.,

Solvent (mobile phase): 1,2,4-trichlorobenzene, stabilized with 0.1 wt % BHT, 6 g/4 L.

Solvent flow rate: 1.0 ml/minute,

Sample concentration: 0.25 mg/mL (dissolved at 175° C. for 1 hour),

Injected amount: 300 μl,

Detector: Differential Refractometer available from Waters Corp., and

Calibration curve: Produced from a calibration curve of a set of single-dispersion, standard polystyrene sample using a predetermined conversion constant.

The heat of fusion ΔHm of the PP was measured according to JIS K7122 as follows: A PP sample was heat-treated at 190° C. for 10 minutes in a nitrogen atmosphere in a sample holder of a differential scanning calorimeter (DSC-System 7 available from Perkin Elmer, Inc.), cooled to 40° C. at a speed of 10° C./minute, kept at 40° C. for 2 minutes, and heated to 190° C. at a speed of 10° C./minute. As shown in FIG. 1, a straight line passing through points on a DSC curve (melting curve) obtained by the temperature-elevating process at 85° C. and 175° C. was drawn as a base line, and the amount of heat was calculated from an area S1 of a hatched portion encircled by the base line and the DSC curve. The amount of heat (unit: J) was divided by the weight (unit: g) of the sample to determine the heat of fusion ΔHm (unit: J/g).

Figure 2:
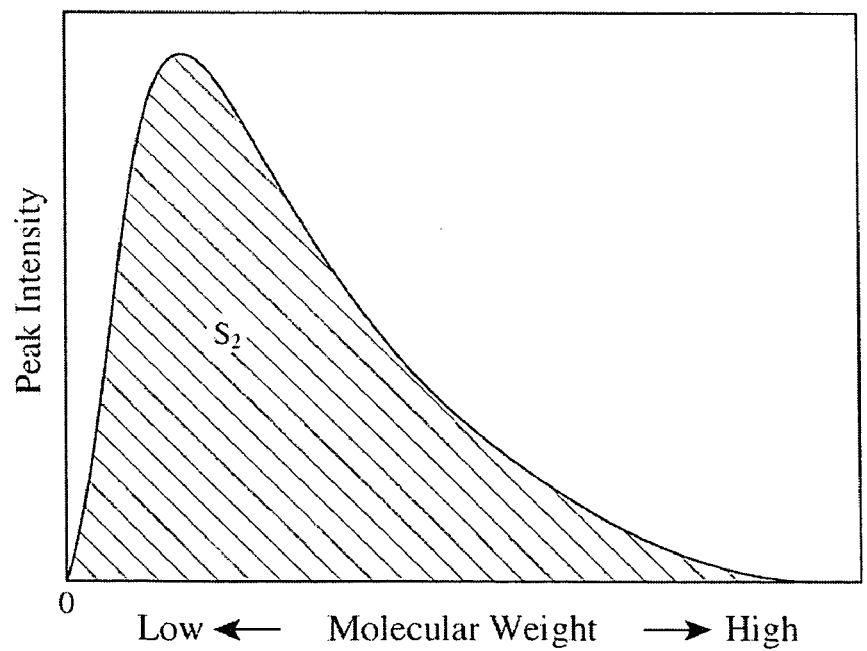
FIG. 2 is a graph showing another example of typical GPC curves.
Figure 3:
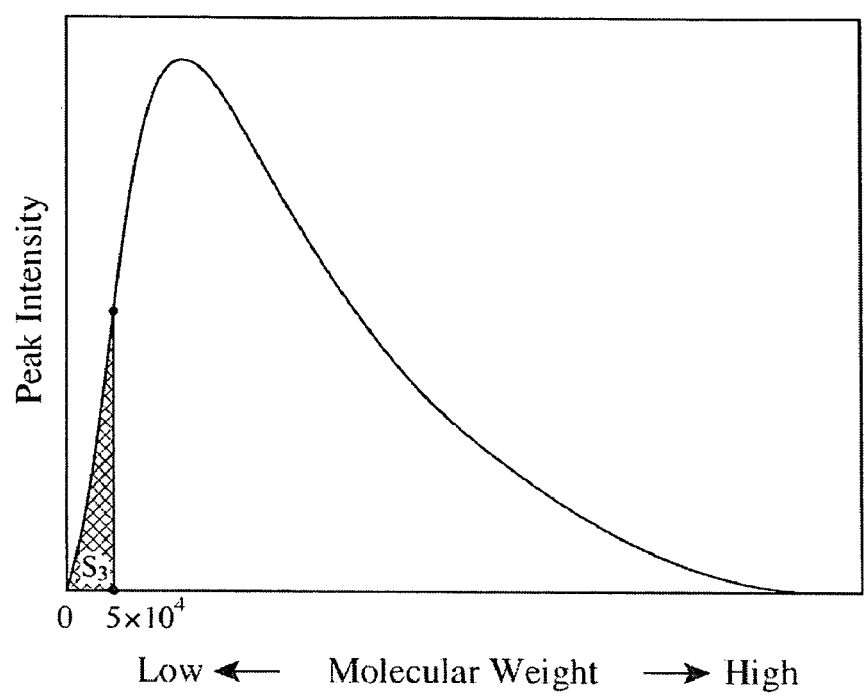
FIG. 3 is a graph showing the same GPC curve as in FIG. 2, in which a low-molecular-weight portion is hatched.

The percentage (on a mass basis) of a fraction having a molecular weight of $5 \times 10^4$ or less to the entire PP was determined as follows: To determine the amount of the entire PP, an area S2 of a hatched portion encircled by the GPC curve and the base line in FIG. 2 was measured. To determine the amount of the fraction having a molecular weight of $5 \times 10^4$ or less, an area S3 in FIG. 3 was measured. The percentage of the fraction having a molecular weight of $5 \times 10^4$ or less was calculated by (S3/S2)×100 (% by mass).

Thirty-five parts by mass of the resultant mixture was charged into a strong-blending double-screw extruder having an inner diameter of 58 mm and LID of 42, and 65 parts by mass of liquid paraffin [40 cSt (40° C.)] was supplied to the double-screw extruder via a side feeder. Melt-blending was conducted at 210° C. and 200 rpm to prepare a second polyolefin solution. This second polyolefin solution was formed into a second gel-like sheet in the same manner as above. A second microporous polyolefin membrane B was formed from the second gel-like sheet in the same manner as above.

(3) Lamination

The second microporous polyolefin membrane B was sandwiched by two first microporous polyolefin membranes A, caused to pass through a pair of rolls heated to a temperature of 100° C., and bonded at pressure of 0.5 MPa to form a three-layer, microporous polyolefin membrane of configuration ABA.

Example 2

First and second polyolefin solutions were prepared in separate double-screw extruders in the same manner as in Example 1, and these solutions were supplied from the double-screw extruders to a three-layer-sheet-forming T-die. As a result, a laminate comprising a first polyolefin solution layer, a second polyolefin solution layer and a first polyolefin solution layer in this order was extruded, such that the thickness of the second polyolefin solution layer was 15% of the total thickness. The extrudate was cooled while passing through cooling rolls controlled at 5° C., to form a three-layer, gel-like sheet. Using a tenter-stretching machine, the three-layer, gel-like sheet was simultaneously biaxially stretched at 118° C., such that the stretching magnification was 5× in both machine direction (MD) and transverse direction (TD). The stretched three-layer, gel-like sheet was washed, air-dried, and then fixed to a tenter to conduct a heat-setting treatment at 115° C. for 10 minutes, to produce a three-layer, microporous polyolefin membrane of configuration ABA membrane, in the same manner as in Example 1.

Example 3

A three-layer, microporous polyolefin membrane was produced in the same manner as in Example 2, except for using a propylene homopolymer having Mw of $9.0 \times 10^5$ and a heat of fusion of 109.7 J/g, a fraction having a molecular weight of $5 \times 10^4$ or less being 1.2% by mass, changing the polyolefin composition to 1.4% by mass of the UHMWPE, 68.6% by mass of the HDPE and 30% by mass of the PP, and changing the thickness of the second polyolefin solution layer to 50% of the total thickness of the multi-layer film.

Example 4

A three-layer, microporous polyolefin membrane was produced in the same manner as in Example 2, except for using the same propylene homopolymer as in Example 3, and changing the thickness of the second polyolefin solution layer to 40% of the total thickness of the multi-layer film.

Example 5

A three-layer, microporous polyolefin membrane was produced in the same manner as in Example 2, except for using the same propylene homopolymer as in Example 3, changing the polyolefin composition to 0.6% by mass of the UHMWPE, 29.4% by mass of the HDPE and 70% by mass of the PP, and changing the thickness of the second polyolefin solution layer to 30% of the total thickness of the multi-layer film.

Example 6

A three-layer, microporous polyolefin membrane was produced in the same manner as in Example 2, except for using a propylene homopolymer having Mw of $18.2 \times 10^5$ and a heat of fusion of 107.2 J/g, a fraction having a molecular weight of $5 \times 10^4$ or less being 0.08% by mass, and changing the thickness of the second polyolefin solution layer to 25% of the total thickness of the multi-layer film.

Example 7

A two-layer, microporous polyolefin membrane of configuration AB was produced in the same manner as in Example 6, except that the first and second polyolefin solutions were supplied to a two-layer-sheet-forming T-die to form an extrudate having a first polyolefin solution layer and a second PO solution layer, and that the thickness of the second polyolefin solution layer was changed to 20% of the total thickness of the multi-layer film.

Example 8

A first polyolefin solution was prepared in the same manner as in Example 1 except for using only UHMWPE having Mw of $1.2\times10^6$ as the polyethylene resin, and a second polyolefin solution was prepared in the same manner as in Example 1 except for using the same propylene homopolymer as in Example 3 as the polypropylene. A three-layer, microporous polyolefin membrane was produced in the same manner as in Example 2, except that the resultant polyolefin solutions were used, and that the thickness of the second polyolefin solution layer was changed to 15% of the total thickness of the multi-layer film.

Example 9

A first polyolefin solution was prepared in the same manner as in Example 1 except for using only the HDPE as the polyethylene resin, and a second polyolefin solution was prepared in the same manner as in Example 1 except using the propylene homopolymer used in Example 3 as the polypropylene. The composition comprised 1% by mass of UHMWPE, 49% by mass of the HDPE, and 50% by mass of PP. A three-layer, microporous polyolefin membrane was produced in the same manner as in Example 2 except that the resultant polyolefin solutions were used, and that the thickness of the second polyolefin solution layer was changed to 15% of the total thickness of the multi-layer film.

Example 10

A three-layer, microporous polyolefin membrane was produced in the same manner as in Example 2, except that the same propylene homopolymer as in Example 3 was used as the polypropylene, that the polyolefin composition comprised 50% by mass of the HDPE and 50% by mass of the PP without UHMWPE, and that the thickness of the second polyolefin solution layer was changed to 10% of the total thickness of the multi-layer film.

Example 11

A three-layer, microporous polyolefin membrane was produced in the same manner as in Example 2, except that a polyolefin composition comprising 20% by mass of UHMWPE having Mw of $1.2\times10^6$ and 80% by mass of the same propylene homopolymer as in Example 3 without HDPE was used, and that the thickness of the second polyolefin solution layer was changed to 10% of the total thickness of the multi-layer film.

Example 12

A three-layer, microporous polyolefin membrane was produced in the same manner as in Example 2, except that a propylene homopolymer having Mw of $6.9\times10^5$ and a heat of fusion of 109.6 J/g, a fraction having a molecular weight of $5\times10^4$ or less being 4.2% by mass, was used as the polypropylene, and that the thickness of the second polyolefin solution layer was changed to 10% of the total thickness of the multi-layer film.

Comparative Example 1

An attempt was conducted to produce a three-layer, microporous polyolefin membrane in the same manner as in Example 2, except that a propylene homopolymer having Mw of $3.0\times10^5$ and a heat of fusion of 90.4 J/g, a fraction having a molecular weight of $5\times10^4$ or less being 4.9% by mass, was used as the polypropylene. However, because of poor dispersibility of polypropylene, the three-layer, microporous polyolefin membrane was broken when stretched.

Comparative Example 2

A three-layer, microporous polyolefin membrane was produced in the same manner as in Example 2, except that a propylene homopolymer having Mw of $6.8\times10^5$ and a heat of fusion of 94.6 J/g, a fraction having a molecular weight of $5\times10^4$ or less being 8.4% by mass, was used as the polypropylene, and that the thickness of the second polyolefin solution layer was changed to 50% of the total thickness of the multi-layer film.

Comparative Example 3

A three-layer, microporous polyolefin membrane was produced in the same manner as in Example 2, except that a propylene homopolymer having Mw of $15.6\times10^5$ and a heat of fusion of 78.4 J/g, a fraction having a molecular weight of $5\times10^4$ or less being 1.2% by mass, was used as the polypropylene, and that the thickness of the second polyolefin solution layer was changed to 50% of the total thickness of the multi-layer film.

Comparative Example 4

A polyolefin solution having the same composition and concentration as those of the second polyolefin solution in Example 4 was prepared. A microporous polyolefin membrane was produced in the same manner as in Example 1, except that only this polyolefin solution was extruded from a T-die.

The properties of the (multi-layer) microporous polyolefin membranes produced in Examples 1-12 and Comparative Examples 1-4 were measured by the following methods.

(1) Average Thickness (μm)

The thickness of the (multi-layer) microporous polyolefin membrane was measured by a contact thickness meter (Litematic from Mitsutoyo Corporation) at 5 points in the area of 95 mm×95 mm, and averaged.

(2) Air Permeability (sec/100 cc/20 μm)

Air permeability P1 measured on a (multi-layer) microporous polyolefin membrane having a thickness T1 by an air permeability tester (EGO-1T from Asahi Seiko Ltd.) was converted to air permeability P2 at a thickness of 20 μm by the formula of $P2=(P1\times20)/T1$.

(3) Porosity (%)

Measured by a weight method.

(4) Pin Puncture Strength (mN/20 μm)

The maximum load was measured, when a (multi-layer) microporous polyolefin membrane having a thickness of T1 was pricked with a needle of 1 mm in diameter with a spherical end surface (radius R of curvature: 0.5 mm) at a speed of 2 mm/second. The measured maximum load L1 was converted to the maximum load L2 at a thickness of 20 μm by the formula of L2=(L1×20)/T1, and used as pin puncture strength.

(5) Shutdown Temperature

Figure 4:
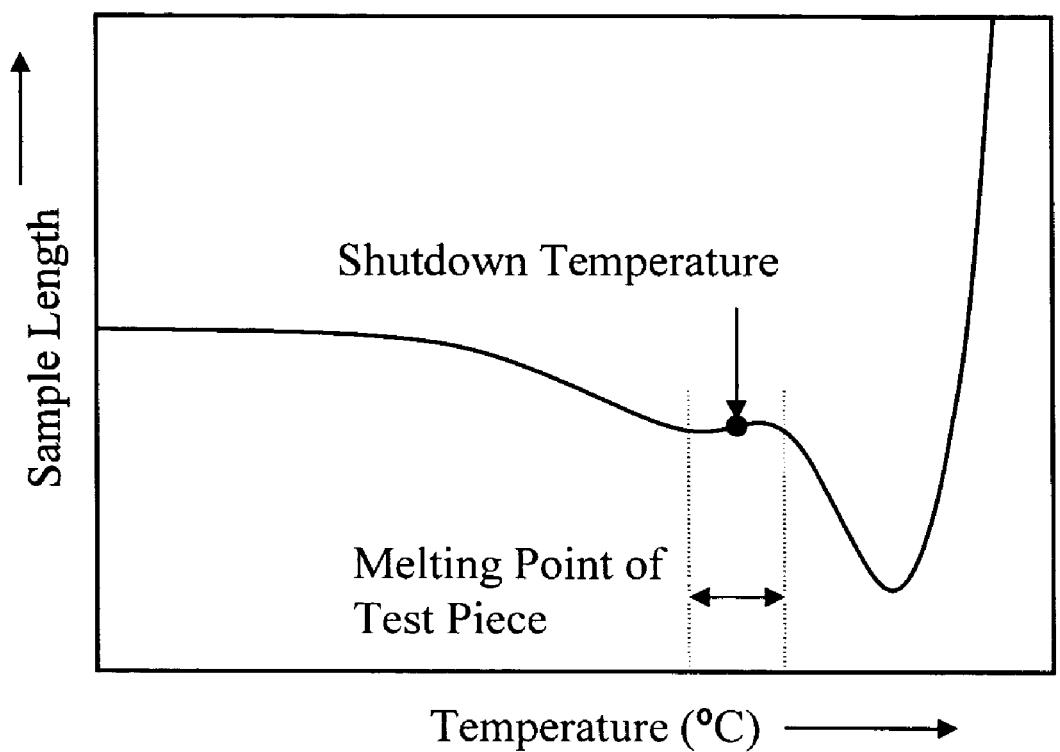
FIG. 4 is a graph showing one example of typical TMA measurement, the shutdown temperature is shown by an arrow.

Using a thermomechanical analyzer (TMA/SS6000 available from Seiko Instruments Inc.), a test piece of 10 mm (TD)×3 mm (MD) was heated from room temperature at a speed of 5° C./min, while pulling the test piece in a longitudinal direction at a constant load of 2 gf, and the temperature at an inflection point of the sample length observed near the melting point of the test piece was defined as "shutdown temperature." (see FIG. 4 for an example).

(6) Meltdown Temperature (° C.)

A (multi-layer) microporous polyolefin membrane of 5 cm×5 cm was sandwiched by blocks each having a circular opening of 12 mm in diameter, and a tungsten carbide ball of 10 mm in diameter was placed on the (multi-layer) microporous polyolefin membrane in the circular opening. While heating at a temperature-elevating speed of 5° C./minute, the temperature at which the (multi-layer) microporous polyolefin membrane was ruptured by melting was measured.

TABLE 1

|  |  | No. | | | |
| --- | --- | --- | --- | --- | --- |
|  |  | Example 1 | Example 2 | Example 3 | Example 4 |
| Resin Composition | | | | | |
| Polyethylene Resin | | | | | |
| UHMWPE | Mw$^{(1)}$ | $2.5 \times 10^6$ | $2.5 \times 10^6$ | $2.5 \times 10^6$ | $2.5 \times 10^6$ |
|  | mass % | 18 | 18 | 18 | 18 |
| HDPE | Mw$^{(1)}$ | $3.0 \times 10^5$ | $3.0 \times 10^5$ | $3.0 \times 10^5$ | $3.0 \times 10^5$ |
|  | mass % | 82 | 82 | 82 | 82 |
| Polyolefin Composition | | | | | |
| UHMWPE | Mw$^{(1)}$ | $2.5 \times 10^6$ | $2.5 \times 10^6$ | $2.5 \times 10^6$ | $2.5 \times 10^6$ |
|  | mass % | 1 | 1 | 1.4 | 1 |
| HDPE | Mw$^{(1)}$ | $3.0 \times 10^5$ | $3.0 \times 10^5$ | $3.0 \times 10^5$ | $3.0 \times 10^5$ |
|  | mass % | 49 | 49 | 68.6 | 49 |
| PP | Mw$^{(1)}$ | $10.1 \times 10^5$ | $10.1 \times 10^5$ | $9.0 \times 10^5$ | $9.0 \times 10^5$ |
|  | Mw/Mn$^{(1)}$ | 4.3 | 4.3 | 2.4 | 2.4 |
|  | LMWF$^{(2)}$ | 4.3 | 4.3 | 1.2 | 1.2 |
|  | Heat of Fusion (J/g) | 108.2 | 108.2 | 109.7 | 109.7 |
|  | mass % | 50 | 50 | 30 | 50 |
| Production Conditions | | | | | |
| Conc. of PE resin (mass %) | | 25 | 25 | 25 | 25 |
| Conc. of PO Comp. (mass %) | | 35 | 35 | 35 | 35 |
| Layer Structure of Extrudate$^{(3)}$ | | — | (I)/(II)/(I) | (I)/(II)/(I) | (I)/(II)/(I) |
| Thickness of Second Layer/ Total Extrudate (%) | | 15$^{(6)}$ | 15 | 50 | 40 |
| Stretching | | | | | |
| First Gel-Like Sheet (MD × TD)$^{(4)}$/Temp. (° C.) | | 5 × 5/118 | —/— | —/— | —/— |
| Second Gel-Like Sheet (MD × TD)$^{(4)}$/Temp. (° C.) | | 5 × 5/118 | —/— | —/— | —/— |
| Multi-Layer, Gel-Like Sheet (MD × TD)$^{(4)}$/Temp. (° C.) | | —/— | 5 × 5/118 | 5 × 5/118 | 5 × 5/118 |
| Heat-Setting Treatment | | | | | |
| First Microporous Membrane Temp. (° C.)/Time (min) | | 122/10 | —/— | —/— | —/— |
| Second Microporous Membrane Temp. (° C.)/Time (min) | | 122/10 | —/— | —/— | —/— |
| Multi-Layer, Microporous Membrane Temp. (° C.)/Time (min) | | —/— | 125/10 | 125/10 | 125/10 |
| Lamination | | | | | |
| Temperature (° C.) | | 100 | — | — | — |
| Pressure (MPa) | | 0.5 | — | — | — |
| Layer Structure$^{(5)}$ | | (I)/(II)/(I) | — | — | — |
| Properties | | | | | |
| Average Thickness (μm) | | 25 | 25 | 25 | 25 |
| Air Permeability (sec/100 cm$^3$/20 μm) | | 732 | 883 | 759 | 796 |
| Porosity (%) | | 31.6 | 27.6 | 29.7 | 27.0 |
| Pin Puncture Strength | | | | | |
| (gf/20 μm) | | 542 | 575 | 516 | 527 |
| (mN/20 μm) | | 5,313 | 5,635 | 5,056 | 5,165 |

TABLE 1-continued

| | | | | | |
|---|---|---|---|---|---|
| Shutdown Temperature (° C.) | | 132.0 | 132.1 | 132.0 | 131.9 |
| Meltdown Temperature (° C.) | | 175.4 | 173.8 | 170.0 | 175.3 |

| | | No. | | | |
|---|---|---|---|---|---|
| | | Example 5 | Example 6 | Example 7 | Example 8 |

Resin Composition

Polyethylene Resin

| | | | | | |
|---|---|---|---|---|---|
| UHMWPE | $Mw^{(1)}$ | $2.5 \times 10^6$ | $2.5 \times 10^6$ | $2.5 \times 10^6$ | $1.2 \times 10^6$ |
| | mass % | 18 | 18 | 18 | 100 |
| HDPE | $Mw^{(1)}$ | $3.0 \times 10^5$ | $3.0 \times 10^5$ | $3.0 \times 10^5$ | — |
| | mass % | 82 | 82 | 82 | — |

Polyolefin Composition

| | | | | | |
|---|---|---|---|---|---|
| UHMWPE | $Mw^{(1)}$ | $2.5 \times 10^6$ | $2.5 \times 10^6$ | $2.5 \times 10^6$ | $2.5 \times 10^6$ |
| | mass % | 0.6 | 1 | 1 | 1 |
| HDPE | $Mw^{(1)}$ | $3.0 \times 10^5$ | $3.0 \times 10^5$ | $3.0 \times 10^5$ | $3.0 \times 10^5$ |
| | mass % | 29.4 | 49 | 49 | 49 |
| PP | $Mw^{(1)}$ | $9.0 \times 10^5$ | $18.2 \times 10^5$ | $18.2 \times 10^5$ | $9.0 \times 10^5$ |
| | $Mw/Mn^{(1)}$ | 2.4 | 2.6 | 2.6 | 2.4 |
| | $LMWF^{(2)}$ | 1.2 | 0.08 | 0.08 | 1.2 |
| | Heat of Fusion (J/g) | 109.7 | 107.2 | 107.2 | 109.7 |
| | mass % | 70 | 50 | 50 | 50 |

Production Conditions

| | | | | |
|---|---|---|---|---|
| Conc. of PE resin (mass %) | 25 | 25 | 25 | 25 |
| Conc. of PO Comp. (mass %) | 35 | 35 | 35 | 35 |
| Layer Structure of Extrudate$^{(3)}$ | (I)/(II)/(I) | (I)/(II)/(I) | (I)/(II) | (I)/(II)/(I) |
| Thickness of Second Layer/ Total Extrudate (%) | 30 | 20 | 25 | 15 |

Stretching

| | | | | |
|---|---|---|---|---|
| First Gel-Like Sheet $(MD \times TD)^{(4)}$/Temp. (° C.) | —/— | —/— | —/— | —/— |
| Second Gel-Like Sheet $(MD \times TD)^{(4)}$/Temp. (° C.) | —/— | —/— | —/— | —/— |
| Multi-Layer, Gel-Like Sheet $(MD \times TD)^{(4)}$/Temp. (° C.) | 5 × 5/118 | 5 × 5/118 | 5 × 5/118 | 5 × 5/118 |

Heat-Setting Treatment

| | | | | |
|---|---|---|---|---|
| First Microporous Membrane Temp. (° C.)/Time (min) | —/— | —/— | —/— | —/— |
| Second Microporous Membrane Temp. (° C.)/Time (min) | —/— | —/— | —/— | —/— |
| Multi-Layer, Microporous Membrane Temp. (° C.)/Time (min) | 125/10 | 125/10 | 125/10 | 125/10 |

Lamination

| | | | | |
|---|---|---|---|---|
| Temperature (° C.) | — | — | — | — |
| Pressure (MPa) | — | — | — | — |
| Layer Structure$^{(5)}$ | — | — | — | — |

Properties

| | | | | |
|---|---|---|---|---|
| Average Thickness (μm) | 25 | 25 | 25 | 25 |
| Air Permeability (sec/100 cm$^3$/20 μm) | 977 | 954 | 986 | 457 |
| Porosity (%) | 27.2 | 27.3 | 27.8 | 37.8 |

Pin Puncture Strength

| | | | | |
|---|---|---|---|---|
| (gf/20 μm) | 550 | 543 | 537 | 555 |
| (mN/20 μm) | 5,390 | 5,321 | 5,282 | 5,439 |
| Shutdown Temperature (° C.) | 132.0 | 132.0 | 132.2 | 131.8 |
| Meltdown Temperature (° C.) | 174.6 | 171.0 | 171.2 | 174.3 |

| | | No. | | | |
|---|---|---|---|---|---|
| | | Example 9 | Example 10 | Example 11 | Example 12 |

Resin Composition

Polyethylene Resin

| | | | | | |
|---|---|---|---|---|---|
| UHMWPE | $Mw^{(1)}$ | — | $2.5 \times 10^6$ | $2.5 \times 10^6$ | $2.5 \times 10^6$ |
| | mass % | — | 18 | 18 | 18 |
| HDPE | $Mw^{(1)}$ | $3.0 \times 10^5$ | $3.0 \times 10^5$ | $3.0 \times 10^5$ | $3.0 \times 10^5$ |

TABLE 1-continued

|  |  |  |  |  |  |
|---|---|---|---|---|---|
|  | mass % | 100 | 82 | 82 | 82 |
|  |  | Polyolefin Composition | | | |
| UHMWPE | Mw[1] | $2.5 \times 10^6$ | — | $1.2 \times 10^6$ | $2.5 \times 10^6$ |
|  | mass % | 1 | — | 20 | 1 |
| HDPE | Mw[1] | $3.0 \times 10^5$ | $3.0 \times 10^5$ | — | $3.0 \times 10^5$ |
|  | mass % | 49 | 50 | — | 49 |
| PP | Mw[1] | $9.0 \times 10^5$ | $9.0 \times 10^5$ | $9.0 \times 10^5$ | $6.9 \times 10^5$ |
|  | Mw/Mn[1] | 2.4 | 2.4 | 2.4 | 3.4 |
|  | LMWF[2] | 1.2 | 1.2 | 1.2 | 4.2 |
|  | Heat of Fusion (J/g) | 109.7 | 109.7 | 109.7 | 109.6 |
|  | mass % | 50 | 50 | 80 | 50 |
|  |  | Production Conditions | | | |
| Conc. of PE resin (mass %) |  | 25 | 25 | 25 | 25 |
| Conc. of PO Comp. (mass %) |  | 35 | 35 | 35 | 35 |
| Layer Structure of Extrudate[3] |  | (I)/(II)/(I) | (I)/(II)/(I) | (I)/(II)/(I) | (I)/(II)/(I) |
| Thickness of Second Layer/ Total Extrudate (%) |  | 15 | 10 | 10 | 10 |
|  |  | Stretching | | | |
| First Gel-Like Sheet (MD × TD)[4]/Temp. (° C.) |  | —/— | —/— | —/— | —/— |
| Second Gel-Like Sheet (MD × TD)[4]/Temp. (° C.) |  | —/— | —/— | —/— | —/— |
| Multi-Layer, Gel-Like Sheet (MD × TD)[4]/Temp. (° C.) |  | 5 × 5/118 | 5 × 5/118 | 5 × 5/118 | 5 × 5/118 |
|  |  | Heat-Setting Treatment | | | |
| First Microporous Membrane Temp. (° C.)/Time (min) |  | —/— | —/— | —/— | —/— |
| Second Microporous Membrane Temp. (° C.)/Time (min) |  | —/— | —/— | —/— | —/— |
| Multi-Layer, Microporous Membrane Temp. (° C.)/Time (min) |  | 125/10 | 125/10 | 125/10 | 125/10 |
|  |  | Lamination | | | |
| Temperature (° C.) |  | — | — | — | — |
| Pressure (MPa) |  | — | — | — | — |
| Layer Structure[5] |  | — | — | — | — |
|  |  | Properties | | | |
| Average Thickness (μm) |  | 25 | 25 | 25 | 25 |
| Air Permeability (sec/100 cm³/20 μm) |  | 422 | 845 | 882 | 835 |
| Porosity (%) |  | 38.5 | 26.0 | 27.0 | 26.6 |
|  |  | Pin Puncture Strength | | | |
| (gf/20 μm) |  | 534 | 567 | 546 | 553 |
| (mN/20 μm) |  | 5,233 | 5,557 | 5,351 | 5,419 |
| Shutdown Temperature (° C.) |  | 132.0 | 132.0 | 132.1 | 132.0 |
| Meltdown Temperature (° C.) |  | 174.3 | 177.4 | 179.2 | 170.8 |

|  |  | No. | | | |
|---|---|---|---|---|---|
|  |  | Comp. Ex. 1 | Comp. Ex. 2 | Comp. Ex. 3 | Comp. Ex. 4 |
|  |  | Resin Composition | | | |
| Polyethylene Resin |  |  |  |  |  |
| UHMWPE | Mw[1] | $2.5 \times 10^6$ | $2.5 \times 10^6$ | $2.5 \times 10^6$ | — |
|  | mass % | 18 | 18 | 18 | — |
| HDPE | Mw[1] | $3.0 \times 10^5$ | $3.0 \times 10^5$ | $3.0 \times 10^5$ | — |
|  | mass % | 82 | 82 | 82 | — |
|  |  | Polyolefin Composition | | | |
| UHMWPE | Mw[1] | $2.5 \times 10^6$ | $2.5 \times 10^6$ | $2.5 \times 10^6$ | $2.5 \times 10^6$ |
|  | mass % | 1 | 1 | 1 | 1 |
| HDPE | Mw[1] | $3.0 \times 10^5$ | $3.0 \times 10^5$ | $3.0 \times 10^5$ | $3.0 \times 10^5$ |
|  | mass % | 49 | 49 | 49 | 49 |
| PP | Mw[1] | $3.0 \times 10^5$ | $6.8 \times 10^5$ | $15.6 \times 10^5$ | $9.0 \times 10^5$ |
|  | Mw/Mn[1] | 4.9 | 5.9 | 3.2 | 2.4 |
|  | LMWF[2] | 4.9 | 8.4 | 1.2 | 1.2 |
|  | Heat of Fusion (J/g) | 94.6 | 94.6 | 78.4 | 109.7 |
|  | mass % | 50 | 50 | 50 | 50 |

TABLE 1-continued

| | | | | |
|---|---|---|---|---|
| Production Conditions | | | | |
| Conc. of PE resin (mass %) | 25 | 25 | 25 | — |
| Conc. of PO Comp. (mass %) | 35 | 35 | 35 | 35 |
| Layer Structure of Extrudate[3] | (I)/(II)/(I) | (I)/(II)/(I) | (I)/(II)/(I) | — |
| Thickness of Second Layer/Total Extrudate (%) | 40 | 50 | 50 | 100 |
| Stretching | | | | |
| First Gel-Like Sheet (MD × TD)[4]/Temp. (° C.) | —/— | —/— | —/— | —/— |
| Second Gel-Like Sheet (MD × TD)[4]/Temp. (° C.) | —/— | —/— | —/— | 5 × 5/118 |
| Multi-Layer, Gel-Like Sheet (MD × TD)[4]/Temp. (° C.) | 5 × 5/118 | 5 × 5/118 | 5 × 5/118 | —/— |
| Heat-Setting Treatment | | | | |
| First Microporous Membrane Temp. (° C.)/Time (min) | —/— | —/— | —/— | —/— |
| Second Microporous Membrane Temp. (° C.)/Time (min) | —/— | —/— | —/— | 125/10 |
| Multi-Layer, Microporous Membrane Temp. (° C.)/Time (min) | —/— | 125/10 | 125/10 | —/— |
| Lamination | | | | |
| Temperature (° C.) | — | — | — | — |
| Pressure (MPa) | — | — | — | — |
| Layer Structure[5] | — | — | — | — |
| Properties | | | | |
| Average Thickness (μm) | — | 25 | 25 | 20 |
| Air Permeability (sec/100 cm³/20 μm) | — | 529 | 1,434 | 653 |
| Porosity (%) | — | 43.6 | 25 | 36.7 |
| Pin Puncture Strength | | | | |
| (gf/20 μm) | — | 327 | 569 | 257 |
| (mN/20 μm) | — | 3,204 | 5,576 | 2,519 |
| Shutdown Temperature (° C.) | — | 132.0 | 132.1 | 132.0 |
| Meltdown Temperature (° C.) | — | 164.3 | 163.2 | 177.0 |

Notes:
[1] Mw, Mn and Mw/Mn represent, respectively, a weight-average molecular weight, number-average molecular weight and molecular weight distribution.
[2] LMWF represents a low-molecular-weight fraction having a molecular weight of $5 \times 10^4$ or less (% by mass).
[3] (I) represents the first polyolefin solution, and (II) represents the second polyolefin solution.
[4] (MD × TD) represents the magnification in a longitudinal direction (MD) and a transverse direction (TD).
[5] The layer structure of a laminate, in which (I) represents the first microporous polyolefin membrane, and (II) represents the second microporous polyolefin membrane.
[6] The thickness ratio of second layer per laminated multi-layer porous membrane.

As shown in Table 1, the multi-layer, microporous polyolefin membranes of Examples 1-12 had well-balanced air permeability, porosity, pin puncture strength, shutdown properties, and meltdown properties. On the other hand, the multi-layer, microporous polyolefin membrane of Comparative Example 2 was poorer in meltdown properties than those of Examples 1-12, the inventors believe because a fraction having a molecular weight of $5 \times 10^4$ or less was more than 5% by mass of the polypropylene. The multi-layer, microporous polyolefin membrane of Comparative Example 3, in which the polypropylene had the heat of fusion of less than 90 J/g, was poorer in air permeability and meltdown properties than those of Examples 1-12. Also, the microporous polyolefin membrane of Comparative Example 4 having no first porous layer of a polyethylene resin was poorer in pin puncture strength than those of Examples 1-12.

What is claimed is:

1. A multi-layer, microporous membrane comprising a first porous layer comprising primarily polyethylene, and a second porous layer comprising 0.1 to 99.9 wt % polyethylene and 0.1 to 99.9 wt % polypropylene, the polypropylene having (1) a weight-average molecular weight of $6 \times 10^5$ or more, (2) a heat of fusion of 90 J/g or more, and (3) a fraction having a molecular weight of $5 \times 10^4$ or less being 5% or less by mass of the polypropylene.

2. The multi-layer, microporous membrane of claim 1 wherein the fraction of polypropylene having a molecular weight of $5 \times 10^4$ or less is 3% or less by mass of the polypropylene.

3. The multi-layer, microporous membrane of claim 1 wherein the polypropylene has a heat of fusion of 100 J/g or more.

4. The multi-layer, microporous membrane of claim 1 wherein the polyethylene of the first and/or second layer has a weight-average molecular weight of $2 \times 10^5$ or more.

5. The multi-layer, microporous membrane of claim 2 wherein the polyethylene of the first and/or second layer has a weight-average molecular weight of $5 \times 10^5$ or more.

6. The multi-layer, microporous membrane of claim 3 wherein the polyethylene of the first and/or second layer has a weight-average molecular weight of from $1 \times 10^6$ to $15 \times 10^6$.

7. The multi-layer, microporous membrane of claim 1 wherein the polyethylene of the first and/or second layer has a weight-average molecular weight of $1 \times 10^4$ or more and less than $5 \times 10^5$.

8. The multi-layer, microporous membrane of claim 1 wherein the polyethylene of the first and/or second layer has an Mw/Mn of 5 to 300.

9. The multi-layer, microporous membrane of claim 1 wherein the polypropylene of the second layer has a weight-average molecular weight of $6.5 \times 10^5$ or more and a heat of fusion of 95 J/g or more, the fraction of the polypropylene having a molecular weight of $5 \times 10^4$ or less being 4.5% or less by mass of the polypropylene.

10. The multi-layer, microporous membrane of claim 1 wherein the polypropylene content of the second layer is from 5 to 95% by mass.

11. The multi-layer, microporous membrane of claim 1 wherein the polypropylene content of the second layer is from 20 to 80% by mass.

12. The multi-layer, microporous membrane of claim 1 wherein the polypropylene content of the second layer is from 30 to 70% by mass.

13. The multi-layer, microporous membrane of claim 1 wherein the polypropylene has a weight-average molecular weight of $6 \times 10^5$ to $1 \times 10^6$.

14. The multi-layer, microporous membrane of claim 11 wherein the polypropylene has a Mw/Mn of 2.5 or less.

15. The multi-layer, microporous membrane of claim 1 wherein the polypropylene has a weight-average molecular weight of $1 \times 10^6$ to $1.5 \times 10^6$.

16. The multi-layer, microporous membrane of claim 1 wherein the polypropylene has a Mw/Mn of 3 or less.

17. The multi-layer, microporous membrane of claim 1 wherein the polypropylene has a weight-average molecular weight of $1.5 \times 10^6$ to $2 \times 10^6$.

18. The multi-layer, microporous membrane of claim 1 wherein the polypropylene has a Mw/Mn of 4 or less.

19. The multi-layer, microporous membrane of claim 1 wherein the polypropylene has a weight-average molecular weight of greater than $2 \times 10^6$.

20. The multi-layer, microporous membrane of claim 1 wherein the polypropylene has a Mw/Mn of 5 or less.

21. The multi-layer, microporous membrane of claim 1 having a porosity of 25 to 80%, an air permeability of 20 to 2,000 seconds/100 cc (converted to the value at 20-gm thickness), a pin puncture strength of 2,000 mN/20 μm or more, a shut down temperature of 120 to 140° C., and a meltdown temperature of 170° C. or higher.

22. The multi-layer, microporous membrane of claim 1 having a thickness of 3-200 μm.

23. The multi-layer, microporous membrane of claim 1 comprising a two-layer structure comprising the first porous layer and the second porous layer; a three-layer structure comprising the first porous layer, the second porous layer and the first porous layer; or a three-layer structure comprising the second porous layer, the first porous layer and the second porous layer.

24. A method for producing a multi-layer, microporous membrane comprising the steps of
(1) preparing a first melt-blend polyolefin solution comprising polyethylene and a first diluent;
(2) preparing a second melt-blend polyolefin solution comprising a polyolefin composition comprising 0.1 to 99.9 wt % polyethylene, 0.1 to 99.9 wt % polypropylene having a weight-average molecular weight of $6 \times 10^5$ or more, and a second diluent; wherein a fraction of polypropylene having a molecular weight of $5 \times 10^4$ or less is 5% or less by mass of the polypropylene; and wherein a heat of fusion of the polypropylene is 90 J/g or more;
(3) extruding the first and second polyolefin solutions through separate dies to form a first extrudate and a second extrudate;
(4) cooling each of the resultant first and second extrudates to form first and second gel-like sheets;
(5) stretching the first and second gel-like sheets in at least one direction;
(6) removing the first and second diluents from the first and second gel-like sheets;
(7) drying the first and second gel-like sheets;
(8) heat-treating the first and second gel-like sheets; and
(9) laminating the resultant first and second gel-like sheets to form the multi-layer, microporous polyolefin membrane.

25. The method of claim 24 wherein the polypropylene has a weight-average molecular weight of $6 \times 10^5$ to $1 \times 10^6$.

26. The method of claim 24 wherein the polypropylene has a Mw/Mn of 2.5 or less.

27. The method of claim 24 wherein the polypropylene has a weight-average molecular weight of $1 \times 10^6$ to $1.5 \times 10^6$.

28. The method of claim 24 wherein the polypropylene has a Mw/Mn of 3 or less.

29. The method of claim 24 wherein the polypropylene has a weight-average molecular weight of $1.5 \times 10^6$ to $2 \times 10^6$.

30. The method of claim 24 wherein the polypropylene has a Mw/Mn of 4 or less.

31. The method of claim 24 wherein the polypropylene has a weight-average molecular weight of greater than $2 \times 10^6$.

32. The method of claim 24 wherein the polypropylene has a Mw/Mn of 5 or less.

33. The method of claim 24 wherein the fraction of polypropylene having a molecular weight of $5 \times 10^4$ or less is 3% or less by mass of the polypropylene.

34. The method of claim 24 wherein the polypropylene has a heat of fusion of 100 J/g or more.

35. The method of claim 24 wherein the polyethylene of the first and/or second polyolefin solution has a weight-average molecular weight of $2 \times 10^5$ or more.

36. The method of claim 24 wherein the polyethylene of the first and/or second polyolefin solution has a weight-average molecular weight of $5 \times 10^5$ or more.

37. The method of claim 36 wherein the polyethylene of the first and/or second polyolefin solution has a weight-average molecular weight of from $1 \times 10^6$ to $15 \times 10^6$.

38. The method of claim 24 wherein the polyethylene of the first and/or second polyolefin solution has a weight-average molecular weight of $1 \times 10^4$ or more and less than $5 \times 10^5$.

39. The method of claim 24 wherein the polypropylene of the second polyolefin solution has a weight-average molecular weight of $6.5 \times 10^5$ or more and a heat of fusion of 95 J/g or more, the fraction having a molecular weight of $5 \times 10^4$ or less being 4.5% or less by mass of the polypropylene.

40. The method of claim 24 wherein the polypropylene content of the second polyolefin solution is from 5 to 95% by mass.

41. The method of claim 24 wherein the polypropylene content of the second polyolefin solution is from 20 to 80% by mass.

42. The method of claim 24 wherein the polypropylene content of the second polyolefin solution is from 30 to 70% by mass.

43. The method of claim 24 wherein step (9) comprises forming an at least three layer microporous membrane by laminating the resultant first gel-like sheet to each opposite side of the second gel-like sheet.

44. The method of claim 24 wherein step (9) comprises forming an at least three layer microporous membrane by laminating the resultant second gel-like sheet to each opposite side of the first gel-like sheet.

45. The method of claim 24 wherein the polyethylene resin in the first melt-blend polyolefin solution and the polyolefin composition in the second melt-blend polyolefin solution are 1 to 50% by mass of the respective melt-blend polyolefin solution.

46. A method for producing a multi-layer, microporous membrane comprising the steps of
   (1) preparing a first melt-blend polyolefin solution comprising a polyethylene resin and a first diluent;
   (2) preparing a second melt-blend polyolefin solution comprising a second diluent and a polyolefin composition comprising a polyethylene and polypropylene having a weight-average molecular weight of $6 \times 10^5$ or more and a heat of fusion (measured by a differential scanning calorimeter) of 90 J/g or more, a fraction of the polypropylene having a molecular weight of $5 \times 10^4$ or less being 5% or less by mass of the polypropylene;
   (3) simultaneously coextruding the first and second polyolefin solutions through dies to form a laminar coextrudate;
   (4) cooling the laminar coextrudate to form a multi-layer gel-like sheet;
   (5) stretching the multi-layer gel-like sheet in at least one direction;
   (6) removing the first and second diluents from the stretched multi-layer gel-like sheet;
   (7) drying the multi-layer gel-like sheet; and
   (8) heat-treating the multi-layer gel-like sheet to form the multi-layer, microporous polyolefin membrane.

47. The method of claim 46 wherein the laminar coextrudate product of step (3) comprises layers of the first gel-like sheet on each opposite side of the second gel-like sheet to form the multi-layer, microporous polyolefin membrane.

48. The method of claim 46 wherein the laminar coextrudate product of step (3) comprises layers of the second gel-like sheet on each opposite side of the first gel-like sheet to form the multi-layer, microporous polyolefin membrane.

49. A battery separator composed of a multi-layer, microporous membrane comprising a first porous layer comprising primarily polyethylene, and a second porous layer comprising polyethylene and polypropylene, the polypropylene having a weight-average molecular weight of $6 \times 10^5$ or more and a heat of fusion (measured by a differential scanning calorimeter) of 90 J/g or more, and a fraction of the polypropylene having a molecular weight of $5 \times 10^4$ or less being 5% or less by mass.

50. The battery separator of claim 49 wherein said microporous membrane comprises a two-layer structure comprising the first porous layer and the second porous layer; a three-layer structure comprising the first porous layer, the second porous layer and the first porous layer; or a three-layer structure comprising the second porous layer, the first porous layer and the second porous layer.

51. The battery separator of claim 49 having a porosity of 25 to 80%, an air permeability of 20 to 2,000 seconds/100 cc (converted to the value at 20-μm thickness), a pin puncture strength of 2,000 mN/20 μm or more, a shut down temperature of 120 to 140° C., and a meltdown temperature of 170° C. or higher.

52. The battery separator of claim 51 having a thickness of 3-200 μm.

53. A battery comprising a battery separator comprising of a multi-layer, microporous polyolefin membrane comprising a first porous layer comprising primarily polyethylene, and a second porous layer comprising a polyethylene and polypropylene, the polypropylene having a weight-average molecular weight of $6 \times 10^5$ or more and a heat of fusion (measured by a differential scanning calorimeter) of 90 J/g or more, a fraction of the polypropylene having a molecular weight of $5 \times 10^4$ or less being 5% or less by mass.

54. The battery of claim 53 wherein the battery separator comprises a two-layer structure comprising the first porous layer and the second porous layer; a three-layer structure comprising the first porous layer, the second porous layer and the first porous layer; or a three-layer structure comprising the second porous layer, the first porous layer and the second porous layer.

55. The battery of claim 53 wherein the battery separator has a porosity of 25 to 80%, an air permeability of 20 to 2,000 seconds/100 cc (converted to the value at 20-μm thickness), a pin puncture strength of 2,000 mN/20 μm or more, a shut down temperature of 120 to 140° C., and a meltdown temperature of 170° C. or higher.

56. The battery of claim 53 wherein the battery separator has a thickness of 3-200 μm.

* * * * *

UNITED STATES PATENT AND TRADEMARK OFFICE
CERTIFICATE OF CORRECTION

PATENT NO. : 7,981,536 B2
APPLICATION NO. : 11/513557
DATED : July 19, 2011
INVENTOR(S) : Kono et al.

It is certified that error appears in the above-identified patent and that said Letters Patent is hereby corrected as shown below:

In Column 27
At line 42, please change "20-gm" to --20-μm--.

In Column 29
At line 3, please delete "resin".

Signed and Sealed this
Tenth Day of January, 2012

David J. Kappos
*Director of the United States Patent and Trademark Office*